(12) United States Patent
Nohmi (10) Patent No.: US 7,436,348 B2
(45) Date of Patent: Oct. 14, 2008

(54) INTERFEROMETER-TYPE RADAR

(75) Inventor: Hitoshi Nohmi, Tokyo (JP)

(73) Assignee: NEC Corporation, Tokyo (JP)

( * ) Notice: Subject to any disclaimer, the term of this patent is extended or adjusted under 35 U.S.C. 154(b) by 202 days.

(21) Appl. No.: 11/393,837

(22) Filed: Mar. 31, 2006

(65) Prior Publication Data

US 2006/0220949 A1 Oct. 5, 2006

(30) Foreign Application Priority Data

Mar. 31, 2005 (JP) ............................. 2005-104168
Apr. 1, 2005 (JP) ............................. 2005-106864

(51) Int. Cl.
*G01S 13/00* (2006.01)
*G01S 13/52* (2006.01)

(52) U.S. Cl. ................. 342/25 R; 342/25 A; 342/25 B; 342/25 C; 342/159; 342/160

(58) Field of Classification Search ................... 342/25, 342/90, 95–97, 107–116, 118, 128, 130, 342/133, 139, 146, 147, 156, 159–162, 175, 342/189, 192, 196, 417, 424
See application file for complete search history.

(56) References Cited

U.S. PATENT DOCUMENTS

| | | | | |
|---|---|---|---|---|
| 4,746,927 A | * | 5/1988 | Lightfoot | ..................... 342/453 |
| 5,081,432 A | * | 1/1992 | Devlin et al. | ................. 332/103 |
| 5,559,516 A | * | 9/1996 | Didomizio et al. | .......... 342/118 |
| 5,818,383 A | * | 10/1998 | Stockburger et al. | ........ 342/109 |
| 6,166,677 A | | 12/2000 | Kikuchi et al. | |
| 6,400,306 B1 | * | 6/2002 | Nohara et al. | .............. 342/25 R |
| 6,661,366 B2 | * | 12/2003 | Yu | ................................ 342/17 |
| 6,762,709 B2 | | 7/2004 | Kikuchi et al. | |
| 6,982,668 B1 | * | 1/2006 | Doerry et al. | ................ 342/160 |
| 2005/0156780 A1 | * | 7/2005 | Bonthron et al. | ............ 342/107 |

FOREIGN PATENT DOCUMENTS

JP 2000-046941 A 2/2000
JP 2003-177175 A 6/2003

OTHER PUBLICATIONS

D.R. Fuhrmann and G. San Antonio, "Transmit Beamforming for MIMO Radar Systems Using Partial Signal Correlation", Conference Record of the Thirty-Eighth Asilomar Conference on Signals, Systems and Computers, 2004. vol. 1, Nov. 7-10, 2004 pp. 295-299 vol. 1.*
Skolnik, Merrill I., "Introducing to Radar Systems", 1980, p. 166.*

* cited by examiner

*Primary Examiner*—Thomas H. Tarcza
*Assistant Examiner*—Peter M Bythrow
(74) *Attorney, Agent, or Firm*—Foley & Lardner LLP (57) ABSTRACT

A transmitter for transmitting signals to targets and a receiver having a large-diameter array antenna for receiving signals reflected from targets are included. The transmitter has a function of outputting an FMCW signal for detecting direction and velocity of the target from a transmitting antenna. The receiver includes: a plurality of correlation processors for performing correlation processing to receiving signals received by respective interference blocks configured such that the large-diameter array antenna is divided into a plurality of equal blocks; and a synthesizer for vector-synthesizing same signal components of signals outputted from the plurality of correlation processors.

8 Claims, 10 Drawing Sheets

INTERFEROMETER-TYPE RADAR

BACKGROUND OF THE INVENTION

1. Field of the Invention

The present invention relates to an interferometer-type radar which observes a flying target.

2. Description of Related Art

Conventionally, an FMCW (Frequency Modulated Continuous Wave) radar has been used as a means for knowing the distance to a target and the velocity of the target, other than a pulse radar. In a conventional FMCW radar, a receiving signal is frequency-converted with the same FMCW signal as a transmitting signal, whereby a baseband signal is generated. The velocity of the target is detected from the Doppler shift component of the baseband signal frequency in the frequency ascending time and the frequency descending time of the FMCW signal, and the distance to the target is obtained from the baseband signal frequency by correcting the Doppler component (see, for example, Japanese Patent Application Laid-open No. 2000-46941 and Japanese Patent Application Laid-open No. 2003-177175). Further, the present inventor also proposes an interferometer-type radar capable of measuring distance and direction with high sensitivity by applying the FMCW radar technique.

However, when the target is moving at a high speed, there is a problem that a baseband signal, which is a frequency-converted receiving signal by a transmitting signal, is affected by a Doppler shift due to the velocity of the target, and at the same time, the baseband frequency changes according to the movement of the target, whereby it is impossible to measure the distance accurately. Further, if the velocity and a change in the velocity of the target are large, or if there are a number of targets of different velocities at the same time, it is difficult to apply the above-mentioned method.

In view of the above, the present inventor developed an interferometer-type radar in which problems of a conventional FMCW radar were solved. In order to realize a highly sensitive interferometer-type radar, it is required to increase the number of elements of a receiving antenna, and to integrate correlation-processed signals for a long time.

However, if the number of elements of the receiving antenna increases, alignment of the antenna is extended so the total process gain obtained by interference processing increases, but at the same time, the directivity of correlation processing becomes sharp. When a target moves at a high speed, the output phase of the interferometer changes according to the movement of the target. Thereby, the integration efficiency is lowered or an integration time cannot be secured, causing a problem that the sensitivity deteriorates comprehensively.

Further, in the case where the distance of a target moving at a high speed is observed by an FMCW radar with high accuracy, a reflecting signal from the target has a Doppler shift, and the distance change within the sweep cycle cannot be disregarded, so it is difficult to obtain the position of the target with high accuracy.

SUMMARY OF THE INVENTION

It is therefore an object of the present invention to provide an interferometer-type radar in which the sensitivity is improved, without increasing the spatial resolution of a receiving antenna.

In order to improve the sensitivity of an interferometer-type radar, a time for integrating correlation-processed signals must be longer. When a target is moving, monitoring should be performed at certain frequencies, and the integration time thereof should be several seconds or less, for example. In order to perform effective integration, the target should not move more than a unit spatial resolution in the integration time.

On the other hand, in order to improve the sensitivity of an interferometer-type radar, gain of a receiving antenna must be improved. Generally, in order to improve the gain with the receiving antenna, a beam width is reduced to thereby increase the spatial resolution. As describe above, improving the gain with the receiving antenna and suppressing the spatial resolution for securing the integration time are in a contradictory relationship.

In view of the above, the present invention improves sensitivity without increasing the spatial resolution by the receiving antenna. That is, the directional resolution of an interferometer-type radar is determined depending on a distance between the most-distant antennas performing interference processing (correlation processing). When a target moves within the integration time of signals to be correlation-processed, the correlation-processing output changes, so a time integration effect cannot be obtained sufficiently. Therefore, by making the beam width of one pixel of an interferometer radar image broad such that the angular resolution of the interference processing becomes sufficiently low with respect to the moving amount of an expected target, it is possible to secure the integration time with respect to the target moving at a high speed.

By reducing the distance between the most-distant antennas of an array antenna, the beam width of one pixel of an interferometer radar image becomes broad. However, if the distance between the antennas is assumed to be constant, the number of elements of the antenna decreases, so the gain of the array antenna also reduces. By arranging a plurality of small-sized interference blocks on the array antenna, in which distance between the most-distant antennas is suppressed, and vector-synthesizing correlated output signals of the respective interference blocks, it is possible to improve the sensitivity without increasing the spatial resolution.

If the arrangements of antennas within the respective blocks and the angular relationships with respect to an infinite target are made to be the same, the same signal components must be outputted from correlated outputs in the same positional relationships in the respective interference blocks. Since each of the interference blocks consists of an independent receiving system, noises are independent, so in the vector sum of the output signals of the interference blocks, S/N is improved by the number of interference blocks.

Note that, however, the interference blocks on the array antenna must satisfy the following condition:

$$C >> 2B \cdot D \sin\theta$$

where a transmission frequency band of a transmitter is B, the largest distance between antennas between the most-distant interference blocks among a plurality of interference blocks to be vector-synthesized is D, a target directional angle from the normal direction of the antenna face is $\theta$, and the light velocity is C.

In the case that the number of antenna elements of the receiving array antenna is 4096*4096, if the number of interference blocks is 512*512 for limiting the beam width, it is possible to provide 64 pieces interference blocks in total, which are divided into 8*8 pieces vertically and horizontally. Since the output signal components of the respective interference blocks are same, S/N improvement of 64 times, that is, about 18 dB, is expected through vector synthesis.

EFFECTS OF THE INVENTION

As described above, according to the present invention, it is possible to improve sensitivity without increasing spatial resolution by a receiving antenna.

Further, it is possible to realize a high-resolution tracking radar by using data of the same antenna as a low spatial resolution highly sensitive interferometer-type radar. That is, it is possible to detect the rough position of a target by using the largest aperture of a receiving antenna, and then capture the specific target to thereby track the position of the specific target with high accuracy.

Further, by using velocity data of the target obtained by MTI ranging, it is possible to perform ranging of the target with high accuracy through linear prediction and frequency correction with respect to the velocity data.

DESCRIPTION OF PREFERRED EMBODIMENT

Hereinafter, an embodiment of the present invention will be explained based on the drawings.

Figure 1:
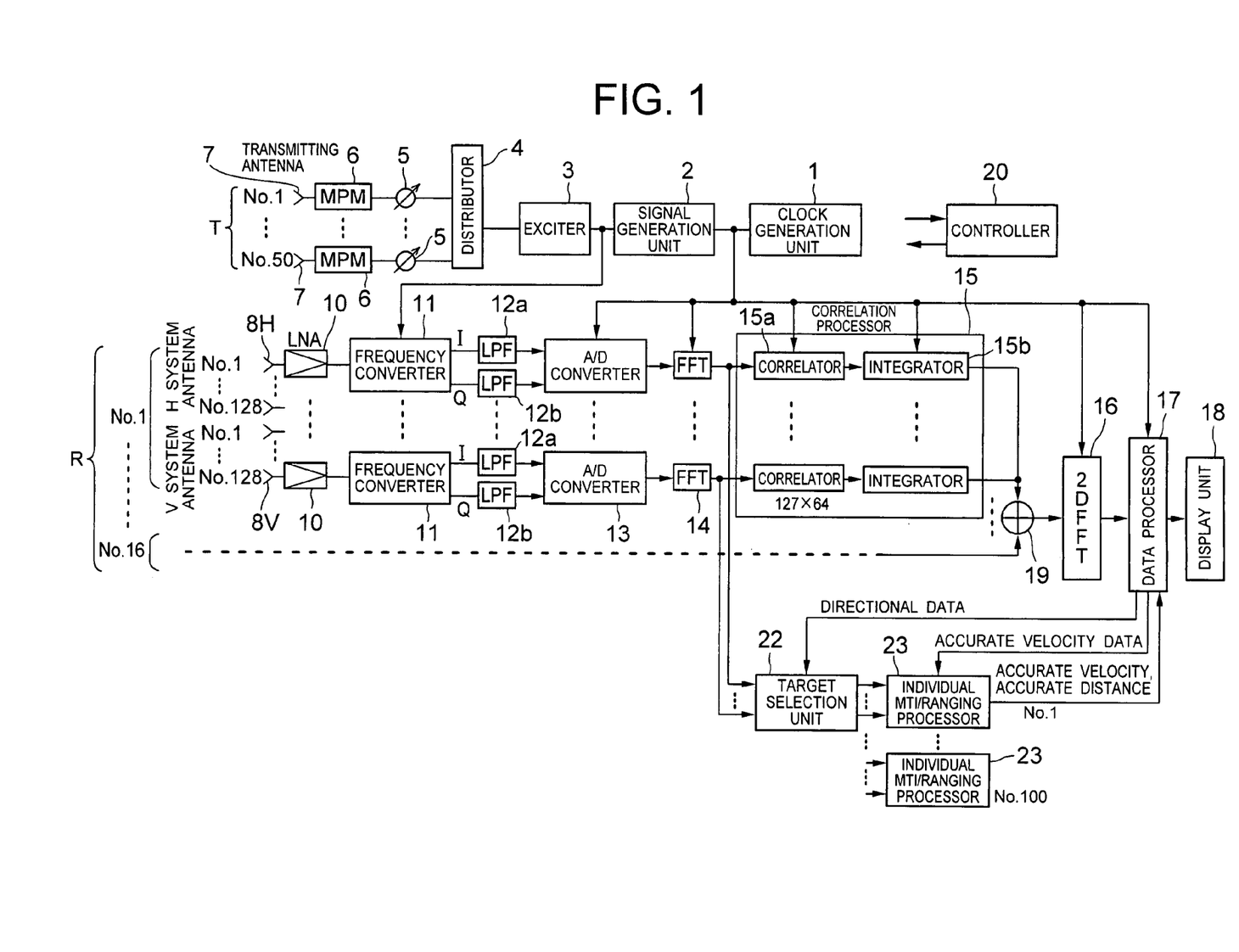
FIG. 1 is a block diagram showing the configuration of an interferometer-type radar according to an embodiment of the present invention.

As shown in FIG. 1, an interferometer-type radar according to the embodiment of the present invention includes: a transmitter T consisting of a plurality of transmission modules; and a plurality of receivers R.

When viewed from the operational side, the interferometer-type radar according to the embodiment of the present invention shown in FIG. 1 has two operational modes, that is, a passive mode and an active mode. The active mode includes a ranging mode, an MTI mode and an ISAR mode. Each mode will be explained.

The passive mode is an operational mode in which directions and radio wave intensity of all radio signal sources in a receivable frequency range within receiving antenna beams, such as signals of a meteorological radar of an aircraft, an FCS radar of a fighter, and a radar mounted on a satellite, are displayed without emitting radio waves (transmission signals) to a target.

Among the active modes, the ranging mode and the MTI mode operate alternatively in a time sharing manner, measure the direction and distance of a target and measure the direction and velocity of a target respectively, and synthesize the measurement results and display them on a screen. Further, in the ranging mode and the MTI mode, a coarse MTI function for observing all views completely and instantaneously and a precise MTI function for performing MTI of a specific target with high accuracy, and a course ranging function for observing all views completely and instantaneously and a precise ranging function for performing ranging of a specific target with high accuracy, operate at the same time. The measurement results of the coarse MTI function, the coarse ranging function, the precise MTI function and the precise ranging function are image-processed, synthesized on the overall display, or displayed as detailed information of an individual target. The ISAR mode is a mode in which radio waves (transmission signals) are transmitted when operated and reflection signals from a target are received, whereby ISAR (inverse synthetic aperture radar) processing is performed so as to create an image.

As shown in FIG. 1, the transmitter T consists of a plurality of modules. The plurality of modules include: a clock generation unit 1, a signal generation unit 2, an exciter 3, a signal distributor 4, a plurality of phase shifters 5 to which signals distributed by the signal distributor 4 are inputted respectively, a plurality of micro power modules (MPM) 6, each of which is connected to each of the phase shifters 5, and a plurality of transmitting antennas 7 for radiating transmitting signals from the respective micro power modules 6. The micro power module (MPM) 6 incorporates a small TWTA (traveling wave tube amplifier) having a phase stabilizing circuit not shown, and amplifies transmitting signals. Further, the exciter 3 increases the amplitude of the transmitting signals from the signal generation unit 2, and outputs them to the signal distributor 4.

Figure 2:
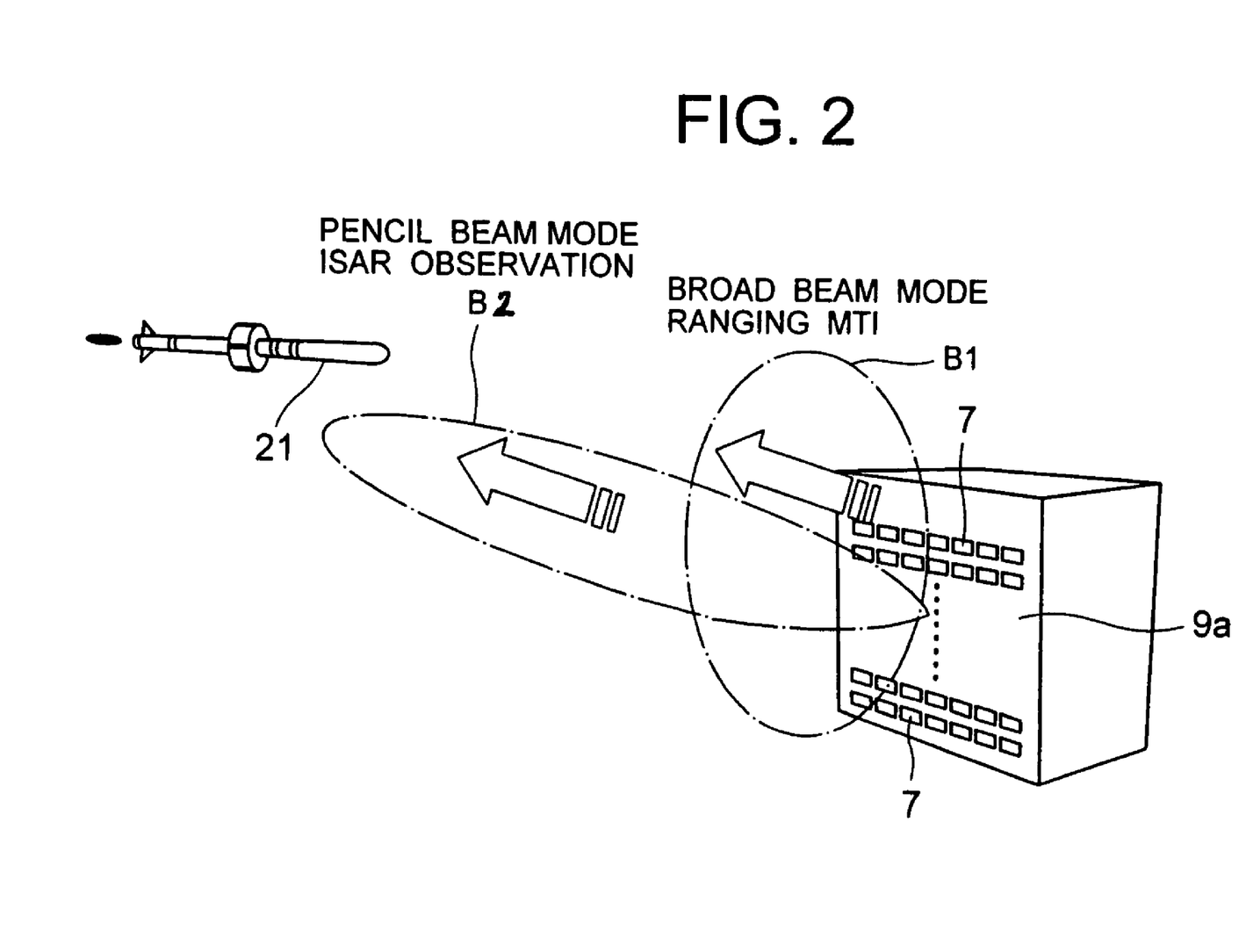
FIG. 2 is a diagram showing transmitting antennas installed in a transmitter of the interferometer-type radar according to the embodiment of the present invention.

As shown in FIG. 2, the transmitting antennas 7 are aligned in a matrix on an antenna face 9a. Although the number of transmitting antenna elements in the embodiment is set to 50 pieces, it is not limited to this number. The antenna face 9a is in a planar shape in which the observable range faces a target 21 with the normal direction thereof being the center. Note that the target 21 may be a high speed flying object such as a missile or an aircraft. In the drawings, a missile is shown.

The transmitting antenna 7 is connected to the micro power module 6 and to the series circuit of the phase shifter 5 in series, respectively. To the phase shifters 5, signals distributed by the signal distributor 4 are inputted in parallel, respectively. The phase shifters 5 output transmitting signals to the transmitting antennas 7 while adjusting the beam widths and the beam directions thereof, respectively. Therefore, as shown in FIG. 2, the transmitting antennas 7 transmit transmitting signals to the target 21 while switching to a broad beam B1 having a wide beam width from a synthesized aperture formed by combining the antennas 7, or to a sharp pencil beam B2 in which the beam width from the synthesized aperture is concentrated in the direction of the specific target 21. Here, the broad beam B1 is outputted in the ranging mode and in the MTI mode, and is a beam for emitting transmitting signals to all view angles of the receiving antennas, described later, with uniform power. The pencil beam B2 is outputted when attention is focused on the specific target 21 so as to observe it with a S/N ratio as high as possible, and in the ISAR monitoring mode, and is a beam in which transmitting signals are emitted toward a specific direction to which the whole transmitting power is concentrated.

The clock generation unit 1 outputs clocks to the signal generation unit 2 and the receivers R and other respective units. The signal generation unit 2, to which clocks are inputted from the clock generation unit 1, outputs CW (continuous wave) signals in the MTI mode, and outputs FMCW (frequency-modulated continuous wave) signals in the ranging mode and in the ISAR mode. CW signals are signals outputted continuously with the frequency being not modulated, and FMCW signals are signals outputted continuously with the frequency being modulated linearly.

Figure 3:
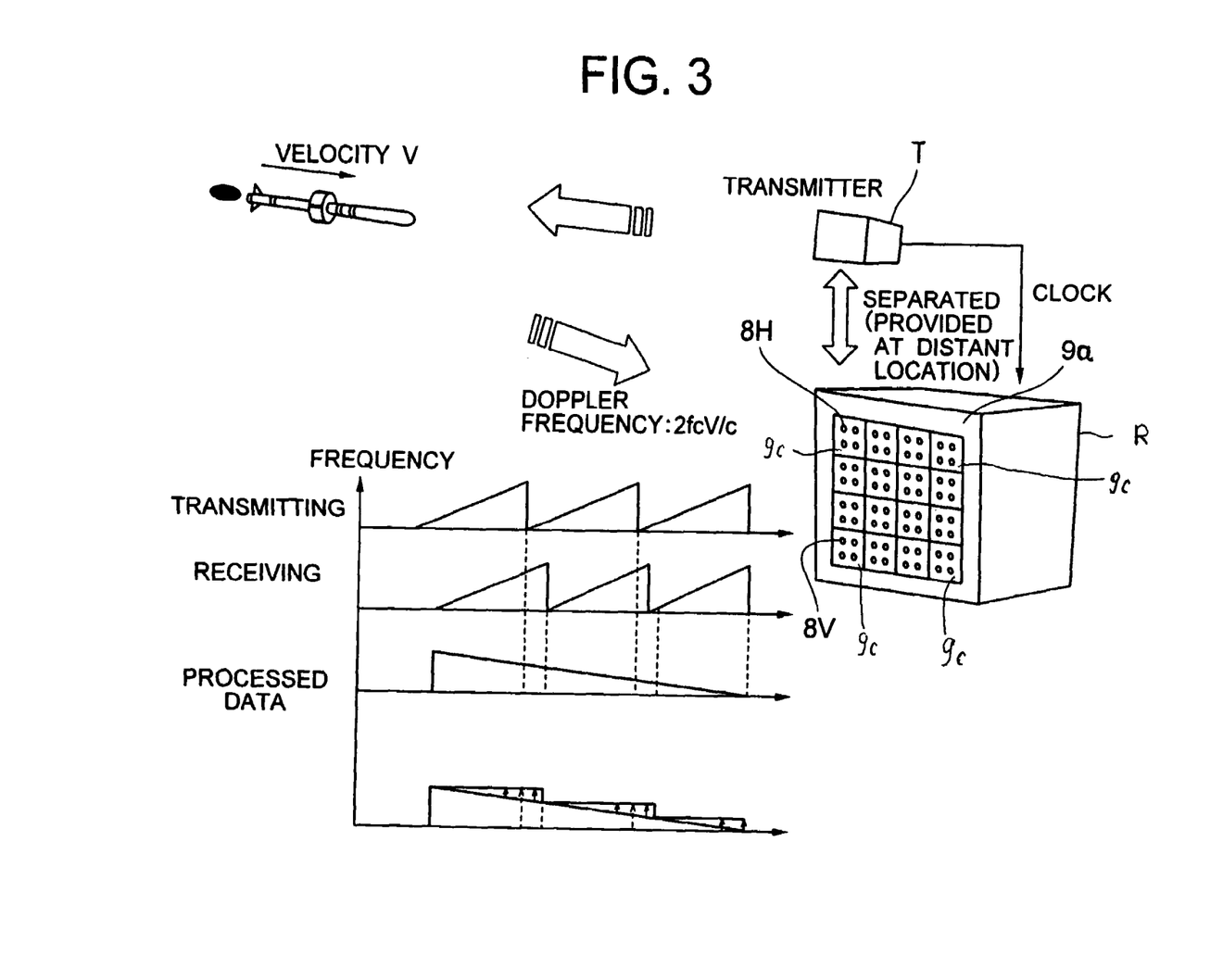
FIG. 3 is a diagram showing the configuration of receiving antennas installed in a receiver of the interferometer-type radar according to the embodiment of the present invention, and showing the time of operating in a ranging mode.

As shown in FIG. 3, the receiver R has antennas aligned vertically and horizontally in a matrix on an antenna face 9a. The antenna face 9a is in a planar shape in which the observable range faces a direction to be observed with the normal direction thereof being the center. As the receiving antenna 8, a microwave (e.g., X band) receiving antenna is used.

Figure 4:
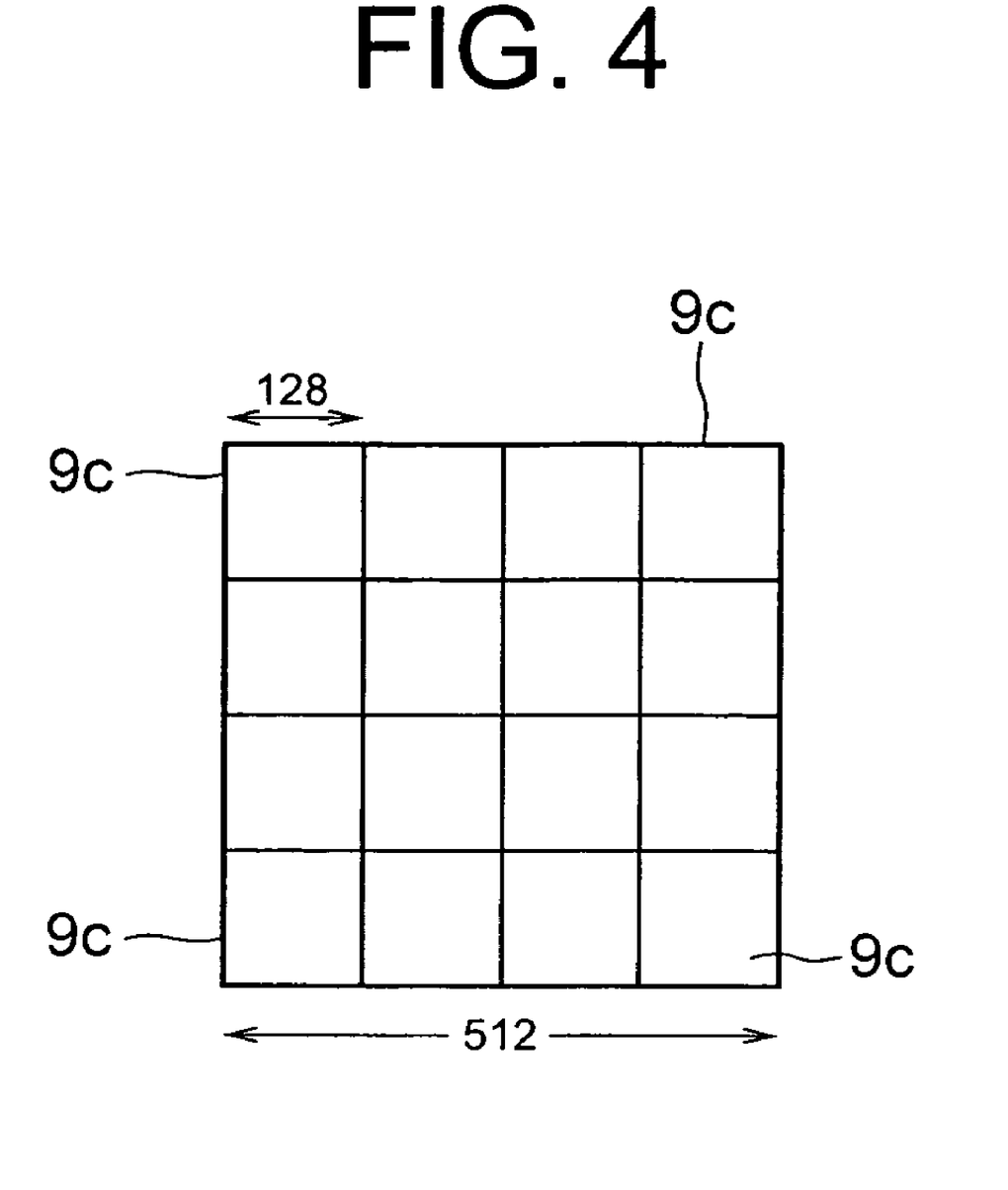
FIG. 4 is a diagram showing interference blocks arranged on the receiving antenna.

In the embodiment shown in FIGS. 3 and 4, 512*512 pieces of antennas 8 are aligned vertically and horizontally in a matrix on the antenna face 9a so as to form an array antenna of large diameter. In order to ease a limitation in the beam width, 16 pieces of interference blocks 9c, divided into 4 vertically and horizontally, are provided, and in each interference block 9c, 128*128 pieces of antennas 8 are aligned in a matrix. Note that the number of interference blocks 9 provided on a receiving antenna is not limited to 16 pieces. Assuming that the dividing number of the interference blocks 9c is n, $2^n$ pieces of interference blocks 9c may be set.

If the alignments of antennas in the respective interference blocks 9c and the angular relationships with respect to an infinite target are same, same signal components are to be outputted from correlated outputs in the same positional relationship in the respective interference blocks 9c. Since each interference block consists of an independent receiving system, noises are independent, and in the vector sum of output signals of the interference blocks, S/N is improved by the number of interference blocks. However, the interference blocks 9c on the array antenna must satisfy the following condition:

$$C \gg 2B \cdot D \sin\theta$$

Here, a transmission frequency band of the transmitter is B, the largest distance between antennas between most-distant interference blocks among a plurality of interference blocks to be vector-synthesized is D, a target directional angle from the normal direction of the antenna face is $\theta$, and the light velocity is C.

The antenna pattern of the transmitting antennas 7 is selected to be the broad beam mode B1 such that irradiation is performed to the whole view angles of the receiving antennas 8 uniformly in the MTI mode and in the ranging mode.

As shown in FIG. 1, the receiving antennas 8 included in each interference block 9c have receiving devices which have almost the same electric specifications, respectively. Each receiving device includes a low noise amplifier (LNA) 10, a frequency converter 11, a pair of lowpass filters 12a and 12b, an A/D converter 13, and an FFT processor 14. These components are provided independently to each receiving antenna 8. Further, the receiver R includes a correlation processor 15 (a correlator 15a and an integrator 15b) for each interference block. Further, the receiver R includes a synthesizer 19 for vector-composing output signals of the correlation processors 15, a two-dimensional FFT processor 16, a data processor 17, a display unit 18, a target selection unit 22 and a plurality of individual MTI/ranging processors 23. The individual MTI/ranging processor 23 includes: an individual MTI unit for measuring the velocity of a target with high accuracy by using coarse MTI, the velocity of the target obtained in coarse ranging, and distance data; and a precise ranging processor for performing correction of the Doppler frequency by the velocity of the target by using velocity data of the individual MTI unit and frequency correction of FMCW baseband signals according to distance changes to thereby range the position of the target with high accuracy.

The low noise amplifier 10 amplifies receiving signals outputted from the receiving antenna 8. The frequency converter 11 performs frequency-conversion by using signals outputted from the signal generation unit 2, with respect to receiving signals received by the receiving antenna 8, extracts an IQ signal (analog signal), which is a complex signal of the baseband, from each receiving signal, and outputs an I signal thereof to one lowpass filer 12a, and outputs a Q signal thereof to the other lowpass filter 12b, respectively. The lowpass filters 12a and 12b remove high frequency components of the IQ signal. The A/D converter 13 synchronizes the analog IQ signal (receiving signal), in which high-frequency components are removed in the lowpass filters 12a and 12b, with a clock from the clock generation unit 1, and A/D-converts it to a digital signal. The FFT processor 14 performs, in parallel, discrete Fourier transformation to the digital signals from the A/D converter 13, which have been received by the receiving antennas 8 (FFT) and demodulated, and outputs the output signals to the correlation processor 15 and the target selection unit 22.

The correlation processor 15, having the correlator 15a and the integrator 15b, performs correlation integration to the output signals from the FFT processor 14 between signals of the receiving antennas 8 included in the interference block 9c. The synthesizer 19 vector-synthesizes output signals of the correlation processors 15 outputted from the respective interference blocks 9c. The two-dimensional FFT processor 16, to which the signals vector-synthesized by the synthesizer 19 are inputted, performs processing to calculate the direction of the radio wave source (target 21) from the phase fronts of the signals inputted into the antenna faces (antenna faces of the receiving antennas) 9b. The data processor 17, to which data vector-synthesized in the synthesizer 19 and performed with the two-dimensional FFT processing in the two-dimensional FFT processor 16 is inputted, outputs the direction of the target 21 classified by velocity of the target in the MTI mode and the direction of the target 21 classified by distance of the target 21 in the ranging mode to the display unit 18, and also outputs directional data of the target 21 to the target selection unit 22 and outputs velocity data of the target 21 to the individual MTI/ranging processors 23.

In the embodiment of the present invention, transmission from the transmitting antennas 7 and reception by the receiving antennas 8 are performed at the same time. Therefore, as shown in FIG. 3, the transmitting antennas 7 and the receiving antennas 8 are installed with a certain distance so as not to interfere with each other as shown by the outline arrow such that transmitting signals from the transmitting antennas 7 do not come around to the receiving antennas 8.

Further, the directional resolution in the embodiment of the present invention is determined by the distance between the receiving antennas 8 and 8 installed with the longest distance. Further, the observable view angle is determined by the beam width of each receiving antenna 8.

In the embodiment of the present invention, by changing the operation of the transmitter T and the receivers R, operation is performed in the MTI mode in which the direction and the velocity of the target 21 are detected with extreme high sensitivity, and in the ranging mode in which the direction and the distance of the target 21 are measured with the same high sensitivity. As shown in FIG. 1, the present invention includes a controller 20. The controller 20 has a function of controlling switching of the operation of the transmitter T and the receivers R between the two operational modes, that is, the MTI mode and the ranging mode, alternately within a range from several tens milliseconds to several seconds, synthesizing the outputted images, and displaying them as highly accurate ranging and MTI radar images. Further, in the MTI mode and the ranging mode, the controller 20 has a controlling function for controlling the operation of the data processor 17 and the individual MTI/ranging processor 23, and performing velocity measurement and distance measurement with high accuracy relating to an individual target.

First, operation in the MTI mode in the present invention will be explained. When an instruction of the MTI mode is inputted from the controller 20 to the transmitter T, the signal generation unit 2, to which clocks are inputted from the clock-generation unit 1, continuously outputs CW signals of a constant frequency, which are outputted to the signal distributor 4 through the exciter 3. The signal distributor 4 distributes the CW signals inputted so as to output them to the phase shifters 5. When the distributed signals are inputted to the phase shifter 5, it adjusts the phase such that the beam width and the beam direction of transmitting signals transmitted from the transmitting antenna 7 have predetermined shapes, and outputs the transmitting signals, which have been adjusted, to the transmitting antenna 7 via the micro power module 6. The transmitting antennas 7 emit continuing CW signals of a constant frequency to the observing area including the target 21 as transmitting signals (transmitting wave).

The controller 20 is a device for outputting an operational instruction of the MTI mode to the transmitter T and the receivers R at the same time, and when the transmitter T transmits transmitting signals (CW signals) to the observing area including the target 21 as described above, the receivers R receive signals (receiving signals) reflected from the target 21. In this way, the transmitter T and the receivers R are operated at the same time, so if transmitting signals from the transmitter T come around to the receivers R as intense signals exceeding the linear operation area (range of small signals; linear range), the receivers R are difficult to distinguish the transmitting signals outputted from the transmitter T from the reflection signals from the target 21. Therefore, the transmitting antennas 7 and the receiving antennas 8 are installed with distances. If the power of the transmitting signals is in the linear operation area, unnecessary transmission signals coming around from the transmitting antennas 7 to the receiving antennas 8 can be separated by the receivers and the FFT processing.

In FIG. 3, with reference also to FIG. 1, it is assumed that there is a target 21 flying at a high speed in an antenna beam direction of transmitting signals transmitted from the transmitting antennas 7. In this case, the transmitting signals from the transmitting antennas 7 are reflected at the target 21, and the reflection waves are received by the receiving antennas 8 as extremely weak receiving signals.

The receiving signals (reflection waves) received by the receiving antennas 8 are affected by a Doppler shift $\Delta f$ due to the velocity V of the target 21. Assuming that the transmission frequency of the transmitting signals transmitted from the transmitting antennas 7 is $f_c$, the velocity of the target 21 is V, the Doppler shift is $\Delta f$, and the light velocity is C, their relationship will be shown as the following equation (1):

$$\Delta f = (2*V*f_c)/C \qquad (1)$$

The signals received by the receiving antennas 8 of H system and the V system are amplified by the low noise amplifiers 10 respectively, and the amplified receiving signals are inputted into the frequency converters 11, respectively. Each frequency converter 11 performs frequency-conversion with the transmitting signals (transmission wave transmitted from the transmitting antennas 7) from the signal generation unit 2 so as to convert them to signals of the baseband frequency (baseband signals).

When the A/D converter 13 receives the baseband signals from the frequency converters 11, the A/D converter 13 converts the baseband signals which are analog signals to digital signals, and outputs the baseband signals which are digital signals to the FFT processor 14.

Next, the FFT processor 14 classifies the inputted baseband signals by Doppler shift frequency (spectral analysis). At this time, DC frequency components included in the baseband signals are reflection signals from the target without a velocity and come-around components from the transmitting antennas 7 to the receiving antennas 8, whereby they are removed by the A/D converter 13 and the FFT processor 14. In an example of an interferometer radar using the frequency of X band, assuming that the maximum value of the measurement object velocity range is 7 Km/s, the maximum Doppler frequency is about 450 KHz. In this case, the A/D conversion frequency becomes more than twice as large as it, which is, 1 MHz for example. In coarse MTI processing, assuming that the required velocity resolution is about 70 m/s, 256-point FFT is required. This output is correlation-processed, integrated, performed with two-dimensional FFT processing, and made into the image of a screen for each velocity.

The FFT processing in the FFT processor 14 will be explained based on FIG. 7. Reflection signals, from the target 21 that the velocity component toward the receiving antennas 8 is V, are affected by a Doppler shift. By the Doppler shift frequency, signals from the target 21 are classified, and a target distribution map by velocity is obtained. For the H System, the output of FFT 14 based on received signal H1 is provided over a frequency range from H1(Wo) to H1(Wn). the output of FFT 14 based on received signal H2 is provided over a frequency range from H2(Wo) to H2(Wn), . . . ,and the output of FFT 14 based on received signal Hn is provided over a frequency range from Hn(Wo) to Hn(Wn). Similarly, for the V System, the output of FFT 14 based on received signal H1 is provided over a frequency range from V1(Wo) to V1(Wn), the output of FFT 14 based on received signal V2 is provided over a frequency range from V2(Wo) to V2(Wn), . . . , and the output of FFT 14 based on received signal Vn is provided over a frequency range from Vn(Wo) to Vn(Wn).

Figure 7:
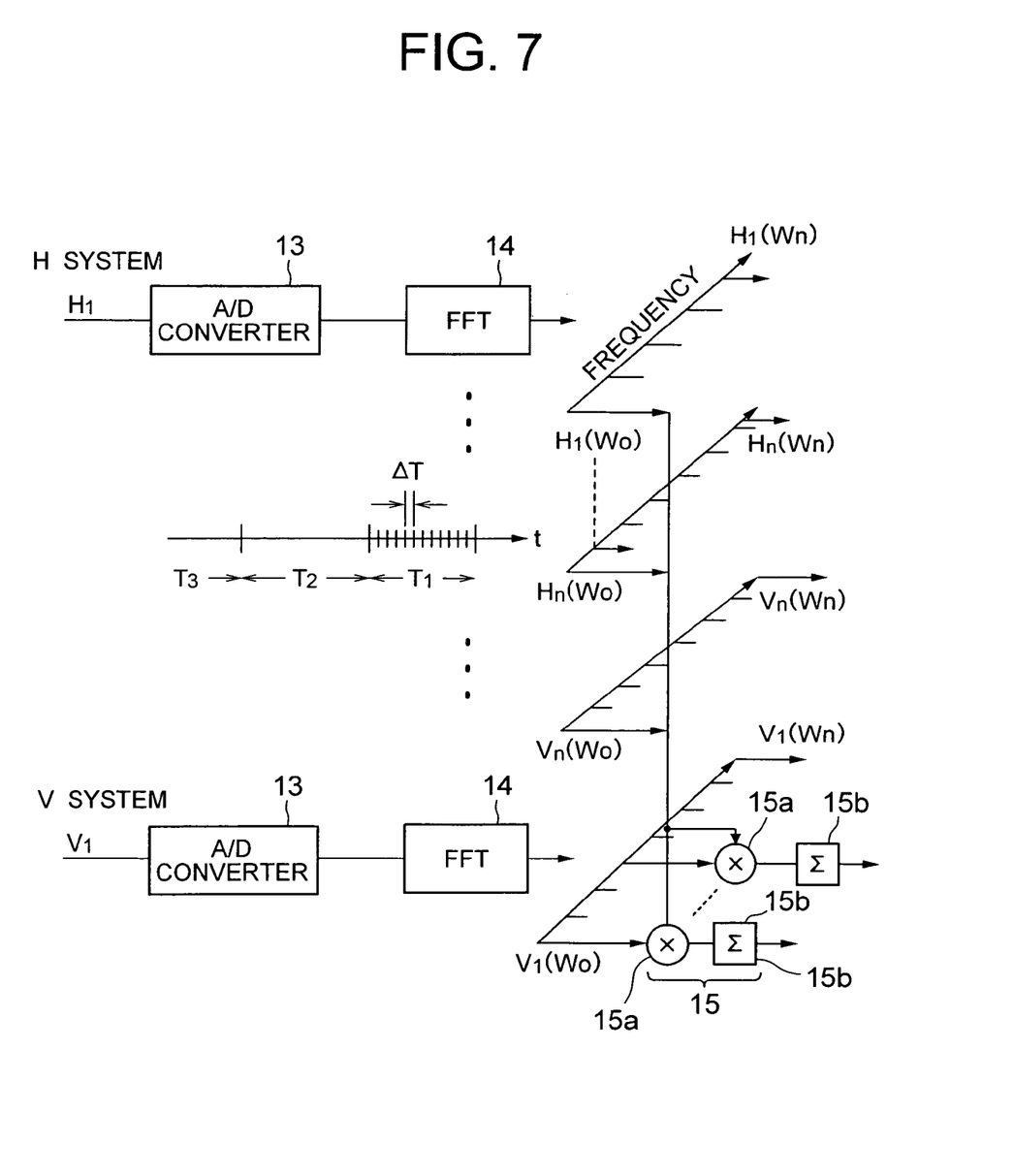
FIG. 7 is a diagram explaining FFT and correlation processing in the embodiment of the present invention.

That is, as shown in FIG. 7, the FFT processor 14 frequency-analyzes the baseband signals which are digital signals A/D-converted by the A/D converter 13 by a certain cycle T1, T2, T3 . . . . In this case, the sample frequency $\Delta t$ of the A/D conversion is required to be not less than two times as large as the maximum Doppler frequency expected as shown in the following formula (2):

$$1/\Delta t > 2\Delta f_{max} \qquad (2)$$

Here, $\Delta f_{max}$ is the maximum Doppler frequency expected.

Further, the data time T1, T2, T3 . . . for inputting and processing at one time in the FFT processor 14 must be not less than the reciprocal time of the Doppler frequency of the required velocity resolution, as shown in the following formula (3):

$$T1, T2, T3 \ldots > 1/\Delta f_{min} \qquad (3)$$

Note that $\Delta f_{min} = 2\Delta V f_c/C$. Here, $\Delta V$ is velocity resolution, and $\Delta f_{min}$ is Doppler frequency resolution.

When the signals classified by Doppler shift frequency in the FFT processor 14 are inputted into the correlation processor (the correlator 15a and the integrator 15b), correlation integration processing is performed by the correlation processor 15. Next, explanation will be given for each of the correlation processing and the integration processing.

First, explanation will be given for a case where the correlator 15a performs correlation processing between signals of the systems of the receiving antennas 8 of the interference block. As shown in FIG. 7, when signals ($F(\omega_k)$) classified by the Doppler shift frequency by the FFT processor 14 are inputted into the correlator 15a, the correlator 15a performs complex multiplying calculation between conjugate signals of signals between signals of a specific antenna 8 which is the base in the interference block and signals of the other receiving antennas 8. Through the correlation processing by the correlator 15a, phase differences by incident directions between signals received by the respective receiving antenna systems are detected, and by obtaining correlations between all receiving antennas 8, it is possible to obtain phase fronts, which are vector-synthesized, of all receiving signals made incident on the antenna face 9b.

The integrator 15b performs integration processing for a long time with respect to the signals which are correlation-processed by the correlator 15a. As a result of integration by the integrator 15b, receiver noises generated within the receiving antennas 8 are suppressed, whereby extremely weak receiving signals not higher than the receiver noise level can be imaged. If common spurious signal exists within the receiver R at the same time, the spurious signal is extracted by the correlation integration processing. Therefore, as local signal generation of the receiver R, not multiplied signals of the common signal source but independently generated signals by a phased lock generator should be used. The DC components included in the baseband signals from the frequency converter 11 are removed by the A/D converter 13 and the FFT processor 14, whereby it is possible to remove an effect of transmitting signals from the transmitting antenna 7 being mixed in receiving signals of the receiving antennas 8.

Figure 6:
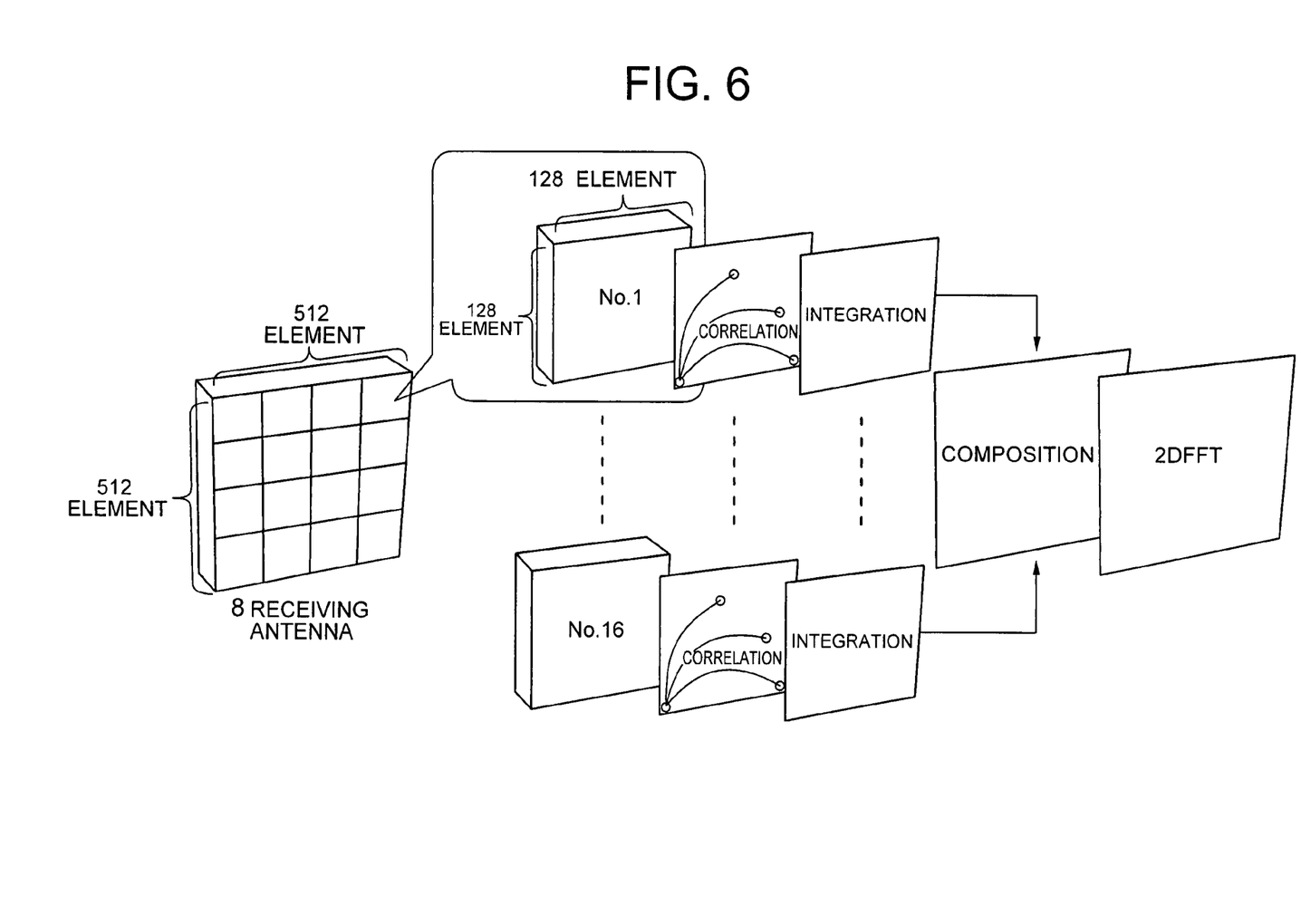
FIG. 6 is a conceptual diagram explaining a case of performing correlation processing for each interference block.

The processing described above is performed for each interference block 9c on the receiving antenna. That is, as shown in FIG. 6, 512*512 pieces of antennas 8 provided on the receiving antenna 2 are aligned by 128*128 pieces in each of the sixteen interference blocks 9c divided into four vertically and horizontally. For each interference block 9c, the correlator 15a performs correlation processing of signals received between the base antenna 8 and the remaining antennas 8. Further, for each interference block 9c, the integrator 15b integrates signals correlation-processed by the correlator 15a. Therefore, output signals of the number corresponding to the number of interference blocks 9c are outputted from the integrator 15b.

The synthesizer 19 vector-synthesizes signals outputted from the integrator 15b of the respective interference blocks 9c. With vector-synthesis performed by the synthesizer 19, the signals become vector-synthesized signals in the largest aperture of the receiving antenna 2, that is, in the plural interference blocks 9c, while the spatial resolution keeps the resolution held by one interference block 9c, whereby S/N becomes 16 times. Therefore, with vector-synthesis performed by the synthesizer 19, correlation calculation is performed by Doppler shift frequencies for all combinations between the base antenna 8 and the other receiving antennas within an interference block. Thereby, it is possible to obtain phase fronts (H-V) of receiving signals (reflected signals from the target 21) inputted into the antenna front 9b for each Doppler shift frequency (velocity of the target 21) classified as shown in FIG. 8A.

Figure 8A:
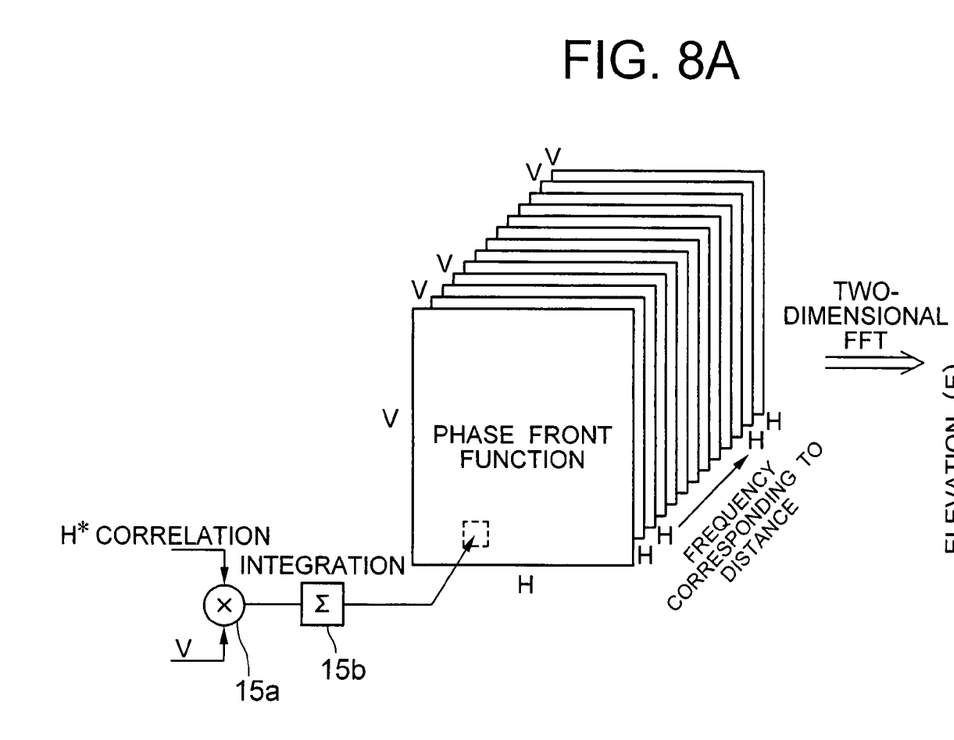
FIGS. 8A and 8B are diagrams explaining two-dimensional FFT processing in the embodiment of the present invention.
Figure 8B:
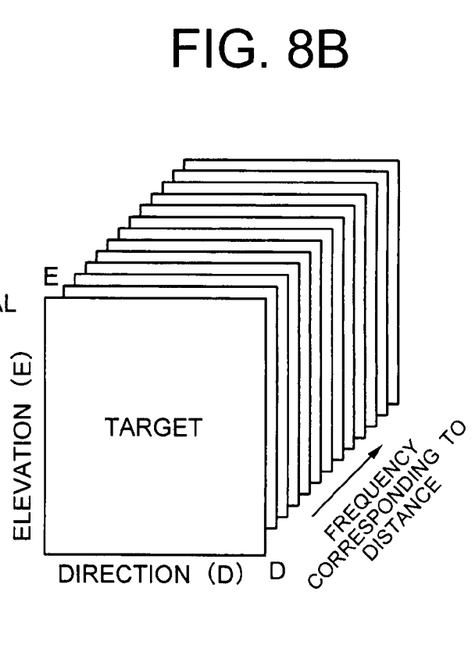

When the two-dimensional FFT processor 16 receives signals from the synthesizer 19, it performs two-dimensional FFT processing of the two-dimensional function of the phase fronts (H-V) shown in FIG. 8A to thereby obtains directions (D-E) of the target 21 classified by velocities shown in FIG. 8B.

Based on the directions (D-E) of the target 21 obtained in the coarse MTI processing described above, the data processor 17 measures the direction and velocity of the specific target 21. That is, in the MTI mode, continuous CW signals are outputted from the transmitting side. The receiving signals are Doppler shifted by the velocity V of the target 21, and the Doppler shift $\Delta f$ is detected as a Doppler frequency. Therefore, the data controller 17 calculates the velocity V of the target 21 from the equation (1). Since CW signals are used as transmitting signals in the present invention, it is possible to perform velocity analysis with very high accuracy. The inverse number of the required Doppler frequency resolution is a data time required for one frequency analysis processing. For example, when the transmitting frequency of transmitting signal is 10 GHz, receiving data of 0.15 ms should be frequency-analyzed in order to obtain a velocity resolution of 100 m/s.

Next, operation in the ranging mode in the present invention will be explained. In the ranging mode, FMCW signals are outputted instead of CW signals outputted in the MTI mode. In the ranging mode, the configuration is the same as that of the MTI mode and the transmitting signals are FMCW, whereby it is possible to measure the distance to the target.

In the ranging mode, the receiving signals are frequency-converted with FMCW signals same as the transmitting signals, whereby the distance to the target 21 is converted to the frequency of the reflection signals (receiving signals).

Therefore, the correlation processor 15 performs complex multiplying calculation by frequency between signals of the specific base antenna 8 in the interference block and the other receiving antennas 8. The output signals of each interference block are vector-synthesized by the synthesizer 19, whereby it is possible to obtain phase fronts (H-V) of receiving signals (reflection signals from the target 21) inputted into the antenna face 9b for respective frequencies classified by distance to the target 21 (distances to the target 21), as shown in FIG. 8A. FIG. 8A shows a plurality of phase fronts (H-V) classified by frequency corresponding to the distances to the target 21.

When the two-dimensional FFT processor 16 receives signals from the correlation processor 15, it performs two-dimensional FFT processing of the two-dimensional functions of the phase fronts (H-V) shown in FIG. 8A to thereby obtain directions (D-E) of the target 21 classified by distance to the target 21, as shown in FIG. 8B. In the coarse processing, if the target 21 has the velocity, the frequency shifts a little more comparing with a case where it remains stationary, but it is possible to suppress it within the tolerance of the distance resolution. In the example of the interferometer-type radar of the X band, assuming that the maximum observable range is 3000 Km, the repetition cycle of the FMCW signal is about 20 mS, and assuming that the maximum distance resolution is 1 m, the FMCW transmitting signal bandwidth is 150 MHz. Since the maximum Doppler frequency shift of the target 21 is about 450 KHz, if the distance resolution is 20 Km in the coarse processing, the tolerance due to the Doppler frequency shift can be disregarded.

In the coarse processing, after receiving signals of the receiving antennas 8 are classified by frequency in the FFT processing performed by the FFT processor 14, correlation processing and integration are performed as same as the case of MTI mode so as to improve the S/N ratio. Irrespective of the number of targets within the view angle, it is possible to trace the loci of the respective targets by the data processor 17 (without degrading the performance). Unless the direction of the target 21 with respect to the receiving antennas 8, the distance to the target 21 and the velocity of the target 21 change significantly (when they are in a tolerance range), the correlation output phase of signals reflected from the target 21 is constant, whereby the phase integration is performed for a long time so as to improve the sensitivity and the accuracy. By removing low frequency components near DC components after converting to baseband signals as same as the case of ranging mode, the come-around components of transmitting signals to the receiving antennas 8 can be removed.

Further, the data processor 17 analyzes the signal intensity for each direction (D-E) outputted from the two-dimensional FFT processor 16 shown in FIG. 8B, and for each distance to the target 21 calculated, detects the direction of the target 21 from the coordinates within the directions (D-E).

The controller 20 switches the operation of the transmitter T and the receivers R between the two operational nodes, that is, the MTI mode and the ranging mode within a range from several tens milliseconds to several seconds, alternatively.

When the display unit 18 receives data from the data processor 17 in the MTI mode, it synthesizes data of the velocity and the direction of the target 21 classified by Doppler frequency, and synthesize-displays the direction and the velocity of the target 21 existing in the whole view angle. Further, when receiving data from the data processor 17 in the ranging mode, the display unit 18 synthesizes data of the distance and direction of the target 21 classified by baseband frequency corresponding to the distance, and synthesizes and displays the direction and distance of the targets 21 existing in the whole view angle. Accordingly, positional information of the target ($x_1$, $y_1$, $z_1$ and $x_2$, $y_2$, $z_2$) are displayed in three dimensions (3D) within the beam B3 of the receiving antennas 8. The velocity and traveling direction information of the target 21 is displayed in vector. Further, the tracking information of the target 21 is displayed in broken lines.

Figure 9:
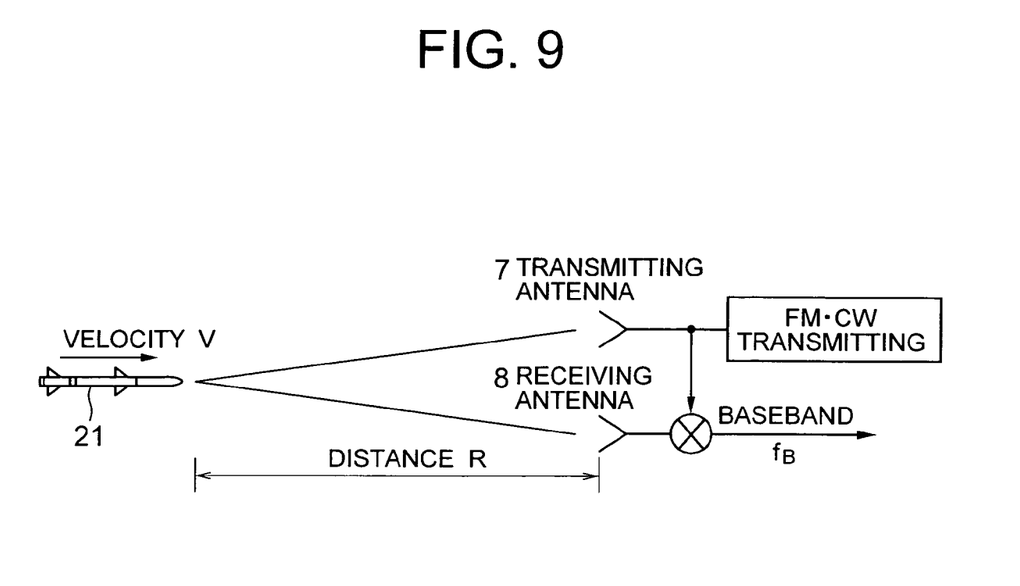
FIG. 9 is a diagram explaining the relationship between a target and an receiving antenna.

Although the coarse MTI mode and the coarse ranging mode described above are in the case where the direction, velocity and distance of the target 21 existing in the whole view angle by the receiving antennas 8 are synthesized and displayed, there is a case where accuracy ranging, tracking and displaying of expected tracking of the specific target 21 are performed, or displaying of an ISAR image as shown in FIG. 9B is performed. This case will be explained. In such a case, it is required to improve the distance resolution, that is, to identify the position and time, by correcting the frequency Δf on the basis of the velocity information of the target 21 obtained in the MTI mode. This processing is performed by the target selection unit 22 and the individual MTI/ranging processor 23 in FIG. 1.

Figure 5:
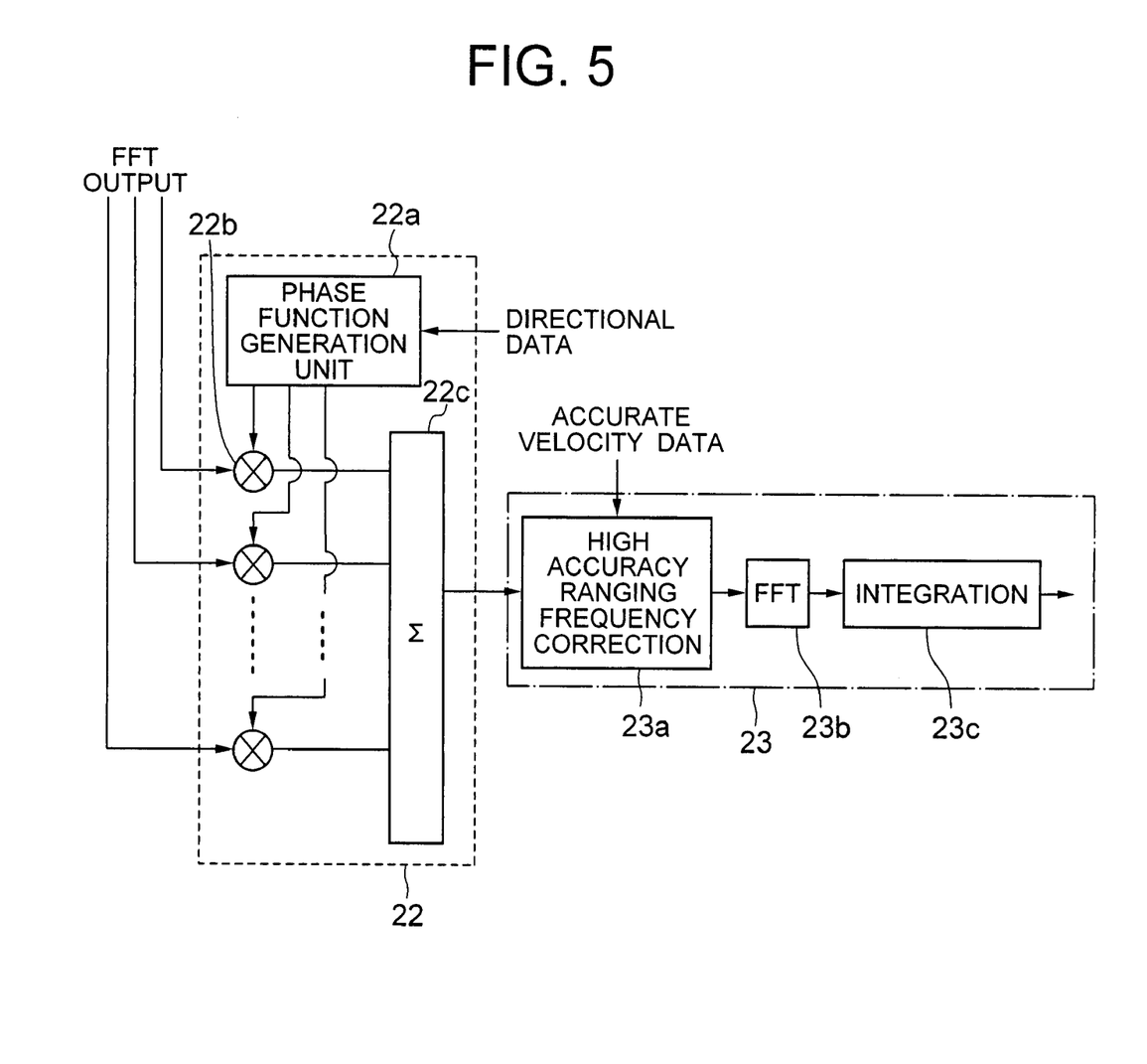
FIG. 5 is a block diagram showing a target selection unit and an individual MTI/ranging processor.

First, processing performed by the target selection unit 22 will be explained. As shown in FIG. 5, the target selection unit 22 performs digital beam forming processing. More specifically, when the target selection unit 22 receives directional data, coarse MTI and coarse ranging data from the data processor 17, it generates a phase function from the phase function generation unit 22a based on the directional data, and outputs it to the multiplier 22b. The multiplier 22b multiplies the frequency output in which target signals of the FFT processor 14 are included from the coarse MTI and the coarse ranging data by the phase function, and outputs the signal to the adder 22c. The adder 22c adds signals outputted from a plurality of multipliers 22b to thereby select the direction of the specific target 21.

The individual MTI/ranging processor 23 performs MTI ranging with higher accuracy by using signals around the baseband frequency corresponding to the coarse MTI and the coarse ranging data in the direction of the specific target selected by the target selection unit 22.

The coarse MTI signal of a target in a specific direction inputted from the FFT processor 15 in the MTI mode and selected by the target selection unit 22 is further frequency-analyzed by the individual MTI processor 23 in detail, and a Doppler frequency is obtained with higher accuracy to thereby determine the velocity. By using the highly accurate velocity data, highly accurate ranging can be performed.

Figure 10:
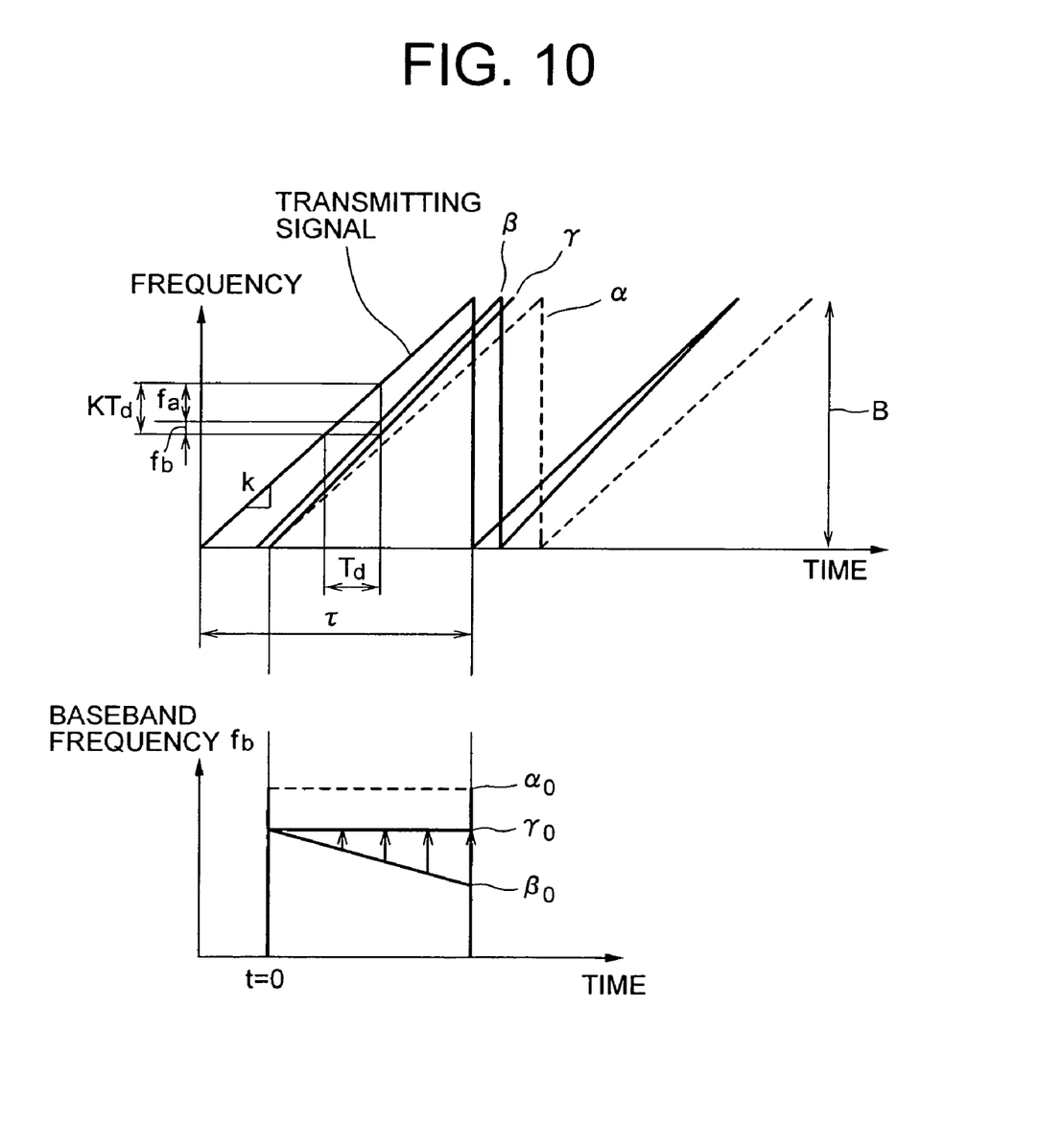
FIG. 10 is a diagram explaining a case of performing frequency correction with velocity data of a target obtained in an MTI mode.

The positioning relationship when the specific target 21 moves to the receiving antenna 8 side becomes one as shown in FIG. 9. In FIG. 10, the relationship between receiving signal and a transmitting signal in the receiving antenna 8 is as follows: when the target is stopping, a receiving signal becomes α, and when the target is approaching at a constant velocity V, a receiving signal becomes β, and γ indicates a change in frequency due to a distance change of the target 21, and B indicates a bandwidth.

As shown in FIG. 10, when the target 21 is stopping, if the difference between the transmitting signal and receiving signal is obtained by the frequency converter 11, the distance to the target 21 is converted to the frequency of the receiving signal. In this case, since the target 21 is stopping, a change in the frequency due to the distance change is not caused. The delay time $T_d$ of the receiving signal with respect to the transmitting signal will be explained in the following equation (4):

$$T_d = 2R/C = 2(R_0 - Vt)/C \quad (4)$$

R($R_0$) is the distance from the receiving antenna 8 to the target 21, C is light velocity, and V is the velocity of the target 21.

Here, as data of the distance R to the target 21, the distance information obtained in the ranging mode is used. Further, as data of the velocity of the target 21, the velocity information obtained in the MTI mode is used. t is obtained based on the distance information obtained in the ranging mode and the velocity information obtained in the MTI mode. In the relationship between a change in the baseband frequency which is frequency-converted by the frequency converter 11 and a time (change in distance to the target 21), the baseband frequency $f_B$ frequency-converted by the frequency converter 11 is shown by the following equation (5):

$$f_B = 2kR_0/C \quad (5)$$

k is a chirp rate, and assuming that the repetition pulse width of the transmitting signal is τ and the bandwidth of the transmitting signal is B, k=B/τ.

In FIG. 9, when the target 21 is stopped, the baseband frequency $f_B$ is determined depending on the distance to the target 21. When the FMCW frequency has the bandwidth B and a sample frequency of A/D converter is also B, the baseband frequency of FMCW becomes constant when turned around.

Accordingly, the baseband signals (receiving signals) classified by frequency corresponding to the distance, which is frequency-converted by the frequency converter 11, becomes constant as shown by the dotted line α0.

On the other hand, a case where the target 21 approaches the receiving antenna 8 at a high speed will be explained. In FIG. 9, when the target 21 moves at a high speed (constant velocity), the baseband frequency $f_B$ changes by a one-dimensional formula of t. That is, the baseband frequency $f_B$ is affected by the Doppler frequency to thereby further cause a frequency change by the distance. The base band $f_B$ is shown by the following equation (6):

$$y = \{-2kVt + 2(kR_0 - Vf_c)\}/C \qquad (6)$$

When the target 21 moves at a high speed, the distance error increases due to the Doppler frequency shift and the sensitivity is deteriorated due to a distance change within the integration time.

The frequency correction unit 23a of the individual MTI/ranging unit 23 obtains directional information of the specific target from the target selection unit 22 and velocity distance data of the coarse processing result from the data processor 17, respectively. After obtaining the data, the frequency correction unit 23a only extracts baseband signals $f_B$ in the direction obtained from the directional information inputted from the data processor 17, among the output signals of the FFT processor 14 corresponding to the Doppler frequency of the target obtained in the coarse MTI processing.

To the extracted baseband signal $f_B$, Doppler frequency and a correction term of the frequency change due to the distance change to the target 21 are added. The baseband signal $f_{out}$, to which the correction term of the frequency change is added, is shown by the next equation (7):

$$f_{out} = f_B - \{2(kVt + Vf_c)\}/C \qquad (7)$$

Next, the FFT unit 23b performs high accuracy ranging processing by using velocity data measured in the frequency correction unit 23a with high accuracy. That is, the FFT unit 23b selects the output frequency of the FFT processor 14 in which the target information is included from the distance information obtained in the coarse ranging mode, and obtains signals for the all receiving antenna systems. Then, the individual MTI/ranging unit 23 synthesizes the signals of the all receiving antenna systems with phase delay such that only the target directions obtained in the coarse processing are made intense to each other, to thereby only extract signal direction components of the target. Then, it performs distance correction and Doppler correction to the extracted signals for an integral time by the integrator 23c by using the velocity data obtained with high accuracy, and then performs frequency analysis with high accuracy. Thereby, it outputs accurate distance information of the specific target to the data processor 17. The data processor 17 outputs highly accurate immediate data and the precise distance data to the display unit 18.

Based on the distance information from the data processor 17, the display unit 18 displays accurate ranging, tracking and an expected locus of the specific target. In the ISAR mode, an ISAR image is displayed. Further, the accuracy ranging mode is used together with the ranging mode, and the display unit 18 displays the accurate distance of the specific target together with a time stamp of the measurement time. In this case, the data processor 17 performs orbit estimation of the target based on the distance information from the individual MTI/ranging processor 23.

Although, in the embodiment described above, a clock from the clock generation unit 1 is used as a reference signal, a reference signal is not limited to a clock. That is, the FMCW radar according to the present invention may be changed to have a configuration including: a transmitter T for transmitting signals which are changed by a constant frequency change rate (chirp rate) k and are repeated in a cycle T; a receiver R having a heterodyne function in which signals reflected from a target are frequency-converted with local origination signals, of frequency change rate k, of a timing completely same as transmitting signals or a timing which is phase-synthesized; and an A/D converter for digitizing with a sample frequency F (F=kT) which is the product of the k and T.

With this configuration, in the FMCW radar in which repetition frequency of FMCW is set to be high and the frequency is changed in wideband, in order to process receiving signal energy of reflection signals at long distance effectively, receiving signal components far exceeding one cycle are changed to be the same frequency by the turnaround characteristics of the digital signals by performing A/D conversion which is equivalent to the product of the repetition cycle and the frequency change rate, whereby all receiving signal energies are processed effectively as shown in FIG. 3.

INDUSTRIAL APPLICABILITY

As described above, according to the present invention, it is possible to improve sensitivity without increasing spatial resolution. Further, it is possible to select a specific target after the position of the target is confirmed with the largest aperture of the large-diameter array antenna, and to range the direction of the target with high accuracy. Further, it is possible to select a specific target and to range the velocity of the target with high accuracy.

What is claimed is:

1. An interferometer-type radar comprising:
   a transmitter for transmitting a signal to a target; and
   a receiver having a large-diameter array antenna for receiving a reflection signal reflected from the target, wherein
   the transmitter has a function of outputting an FMCW signal for detecting direction and velocity of the target from a transmitting antenna, and
   the receiver includes:
      a plurality of correlation processors for performing correlation processing to receiving signals received by respective interference blocks configured such that the large-diameter array antenna is divided into a plurality of equal blocks;
      a synthesizer for vector-synthesizing same signal components by modulating both a phase and an amplitude of signals outputted from the plurality of correlation processors;
      a data processor having a function of obtaining the direction of the target with a low spatial resolution based on a reflection signal from the target received by a largest aperture of the large-diameter array antenna; and
      a target selection unit for obtaining the direction of the target with a spatial resolution according to a largest distance between antennas by performing digital beam forming of the receiving signal before the correlation processing.

2. The interferometer-type radar, as claimed in claim 1, wherein the large-diameter array antenna is so configured that a plurality of antenna elements are aligned in a matrix on an antenna face.

3. The interferometer-type radar, as claimed in claim 1, wherein the interference blocks are arranged such that an antenna face of the large-diameter antenna is equally divided vertically and horizontally.

4. The interferometer-type radar, as claimed in claim 1, wherein the correlation processor is provided independently for each interference block.

5. The interferometer-type radar, as claimed in claim 1, wherein arrangement of the interference blocks on the large-diameter array antenna satisfies a condition of $C > 2B \cdot D \cdot \sin\theta$, where a transmission frequency band of the transmitter is B, a largest distance between antennas between most distant interference blocks among a plurality of interference blocks to be vector-synthesized is D, a directional angle of the target from a normal direction of an antenna face is θ, and light velocity is C.

6. The interferometer-type radar, as claimed in claim 1, wherein a plurality of antenna elements in the interference block are in a matrix such that a plurality of antenna elements provided on the large-diameter array antenna are equally divided.

7. An interferometer-type radar comprising:
    a transmitter for transmitting a signal to a target; and
    a receiver having a large-diameter array antenna for receiving a reflection signal reflected from the target, wherein
    the transmitter has a function of outputting an FMCW signal for detecting direction and velocity of the target from a transmitting antenna, and
    the receiver includes:
        a plurality of correlation processors for performing correlation processing to receiving signals received by respective interference blocks configured such that the large-diameter array antenna is divided into a plurality of equal blocks;
        a synthesizer for vector-synthesizing same signal components by modulating both a phase and an amplitude of signals outputted from the plurality of correlation processors;
        an individual MTI unit for measuring velocity of the target with high accuracy by using the velocity and distance data of the target obtained in coarse MTI and coarse ranging; and
        an individual ranging processor for performing correction of Doppler frequency by the velocity of the target by using velocity data of the individual MTI unit and frequency correction of an FMCW baseband signal according to a distance change to thereby range a position of the target with high accuracy.

8. A method of processing signals transmitted and received by an interferometer-type radar, comprising:
    transmitting a signal to a target; and
    receiving, by a large-diameter array antenna of the interferometer-type radar, a reflection signal reflected from the target, wherein
    the transmitting step comprises outputting an FMCW signal for detecting direction and velocity of the target from a transmitting antenna of the interferometer-type radar, and
    wherein the receiving step comprises:
        performing, by a plurality of correlation processors, correlation processing to receiving signals received by respective interference blocks configured such that the large-diameter array antenna is divided into a plurality of equal blocks;
        vector-synthesizing same signal components by modulating both a phase and an amplitude of signals outputted from the plurality of correlation processors;
        obtaining the direction of the target with a low spatial resolution based on a reflection signal from the target received by a largest aperture of the large-diameter array antenna; and
        obtaining the direction of the target with a spatial resolution according to a largest distance between antennas by performing digital beam forming of the receiving signal before the correlation processing.

* * * * *